April 3, 1962 J. FRASER 3,027,765
LIQUID METERS

Filed April 7, 1959 7 Sheets-Sheet 1

Fig.1

INVENTOR
JOHN FRASER
BY
*Munn & Smiley*
ATTORNEYS

Fig. 4

INVENTOR
JOHN FRASER
BY
ATTORNEYS

INVENTOR
JOHN FRASER
BY
ATTORNEYS

INVENTOR
JOHN FRASER
BY
ATTORNEYS 3,027,765
LIQUID METERS
John Fraser, Chessington, England, assignor to Avery-Hardoll Limited, Chessington, England
Filed Apr. 7, 1959, Ser. No. 804,807
5 Claims. (Cl. 73—233)

This invention relates to liquid meters. Liquids are commonly measured by liquid meters of the displacement type, which measure the volume of liquid passing through them, but for some purposes, such as the fuelling of aircraft, it is now considered preferable to measure the weight as well as the volume of the fuel supplied, and proposals that liquid fuels should be supplied by weight for other purposes have been made.

It is an object of the invention to provide, for use in combination with a liquid meter of the displacement type, apparatus for modifying the readings of the said meter so as to provide a measure of the weight of liquid passing through it.

Another object of the invention is to provide a liquid meter of the displacement type including apparatus whereby the meter measures the weight of liquid passing through it.

According to one aspect of the invention, apparatus for use in combination with a liquid meter of the displacement type comprises a member movable in response to changes of density of liquid flowing through the meter and operative to vary, in accordance with changes in the said density, the velocity ratio between the rotor of the meter and indicating or recording means driven thereby.

According to another aspect of the invention, in a liquid metering device including a meter of the displacement type having a rotary member driven by the flow of liquid through the meter means are provided which are responsive to changes in the density of liquid flowing through the metering device and operate to vary, in accordance with changes in the said density, the speed ratio of a continuously variable change speed device driven by the rotary member, the rotation of the rotary member, and the rotation of an output member of the change-speed device, being compounded by means of a differential gear, and applied to indicating or recording means.

Preferably the density responsive means comprise a float mounted in a chamber through which a proportion of the liquid passing through the metering device is caused to flow, said float being operative, in response to changes of density of said liquid to change the value of fluid pressure acting on a piston so as to displace the said piston, movement of the piston varying the speed ratio of the continuously variable gear and simultaneously adjusting the buoyancy of the float to counteract the effect of the change of liquid density thereon.

The invention is hereinafter described with reference to the accompanying drawings, in which.

Figure 1:
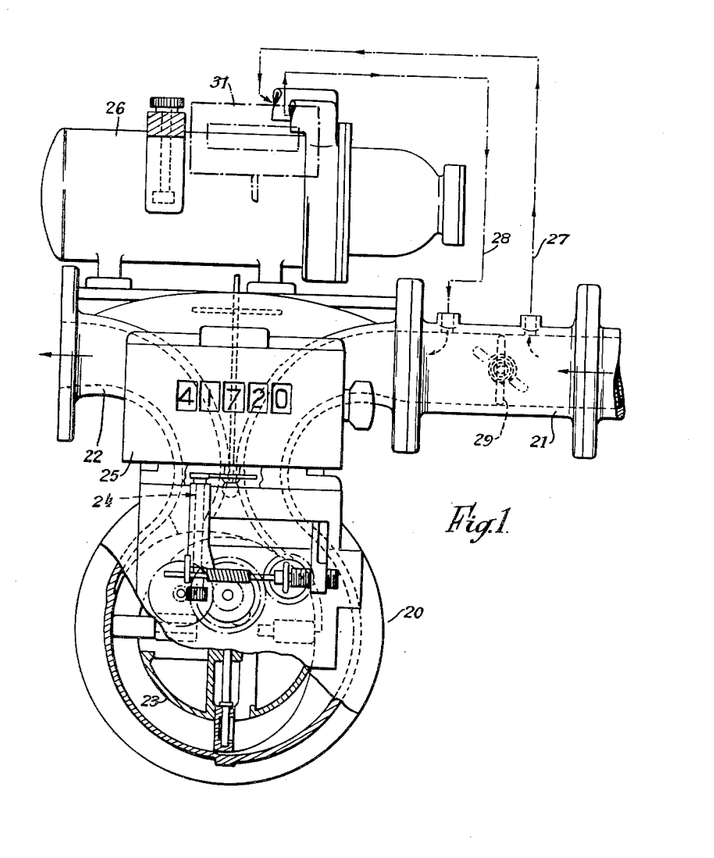
FIGURE 1 is a general view, in elevation, of one form of metering device according to the present invention.

Referring to FIGURE 1, a displacement meter for liquid is shown at 20, liquid being supplied to the meter through a conduit 21 and leaving the said meter through a conduit 22. The meter includes a rotor 23 driven by the liquid passing through the meter and connected by gearing, generally indicated at 24, to a volume indicator 25. A housing 26 mounted on the meter casing houses density-responsive means, and a proportion of the liquid flowing to the meter 20 is caused to pass through the said housing, being led into the housing 26 through a conduit 27 having a bore which is small relative to that of the conduit 21, and returned from the said housing through a similar conduit 28, and conduits 27 and 28 joining the conduit 21 at adjacent points between which there is provided a butterfly valve 29 or other device producing some restriction of flow in the conduit 21.

Figures 2, 3:
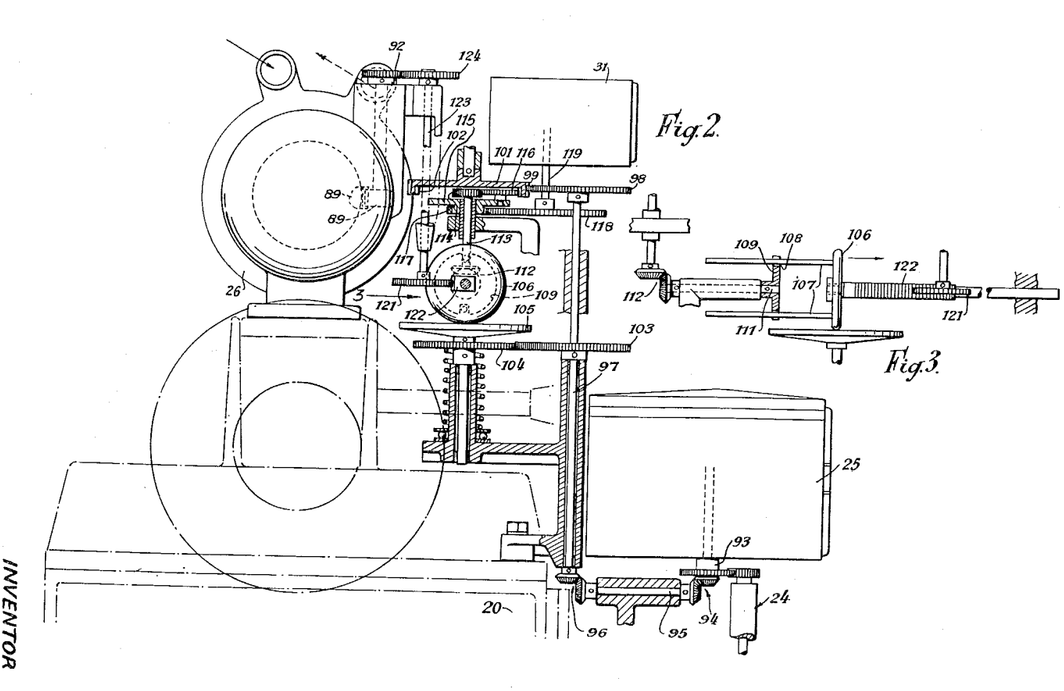
FIGURE 2 is a diagrammatic view showing the driving mechanism for volume and weight indicators included in the device of FIGURE 1.
FIGURE 3 is a view looking in the direction to the arrow 3 in FIGURE 2.

A weight indicator is provided at 31 and, as will be hereinafter described with reference to FIGURES 2 and 3, is driven by the meter 20 through the gearing 24 and further gearing the velocity ratio of which is varied by operation of the density-responsive means.

Referring to FIGURES 4 to 12 the housing 26 includes a cylindrical shell 32 closed at one end and open at the other, an annular head 33 mounted in the open end of the shell 32, and a cup-like end member 34 arranged on the opposite side of the head 33 to the shell 32, the shell 32, head 33 and member 34 being secured together as by bolts or screws (not shown) passing through flanges thereon. The head 33 is grooved circumferentially at 35 (FIGURES 4 and 5) the groove being divided into two portions 36 and 37 by generally radial partitions 38 and 39 (FIGURES 8 and 9), the said portions 36 and 37 constituting respectively inlet and outlet chambers to which are respectively connected passages 41 and 42 themselves connected to the conduits 27 and 28 respectively.

Co-axial pivot pins 43 and 44 mounted in bearings at 45 and 46 in the head 33 (FIGURES 5, 8 and 12) carry a substantially U-shaped yoke 47 on which is mounted a ball-shaped float 48 (FIGURES 4 and 5) in the cup-like end member 34, the interior of which defines a float chamber 49. The float 48 has rigidly fixed to it a longitudinally slotted arm 51 which extends through the centre of the head 33. A cylinder 52 secured to the inner side of the head 33 provides a guide for a piston 53 carrying a packing ring 54 engaging the wall of said cylinder, the end of the cylinder adjacent the head 33 being in communication with the passage through the head, and the other end of the cylinder 52 being in communication with the interior of the shell 32.

The piston 53 is hollow, and is open at its end nearer to the head 33 and, pivotally mounted in the said hollow piston at 55 is an arm 56 formed by two spaced bars 57 (FIGURES 5 and 12) connected by a pin 58 slidable in the slot in the arm 51. The arm 56 carries a pair of weights 59 adjustable along the length of the said arm, the weights 59 being mounted on bars 61 slidable longitudinally relative to the bars 57 under the control of an adjusting screw 62 (FIGURE 5) so that their position relative to the pivot 55 can be adjusted.

Figures 5, 6:
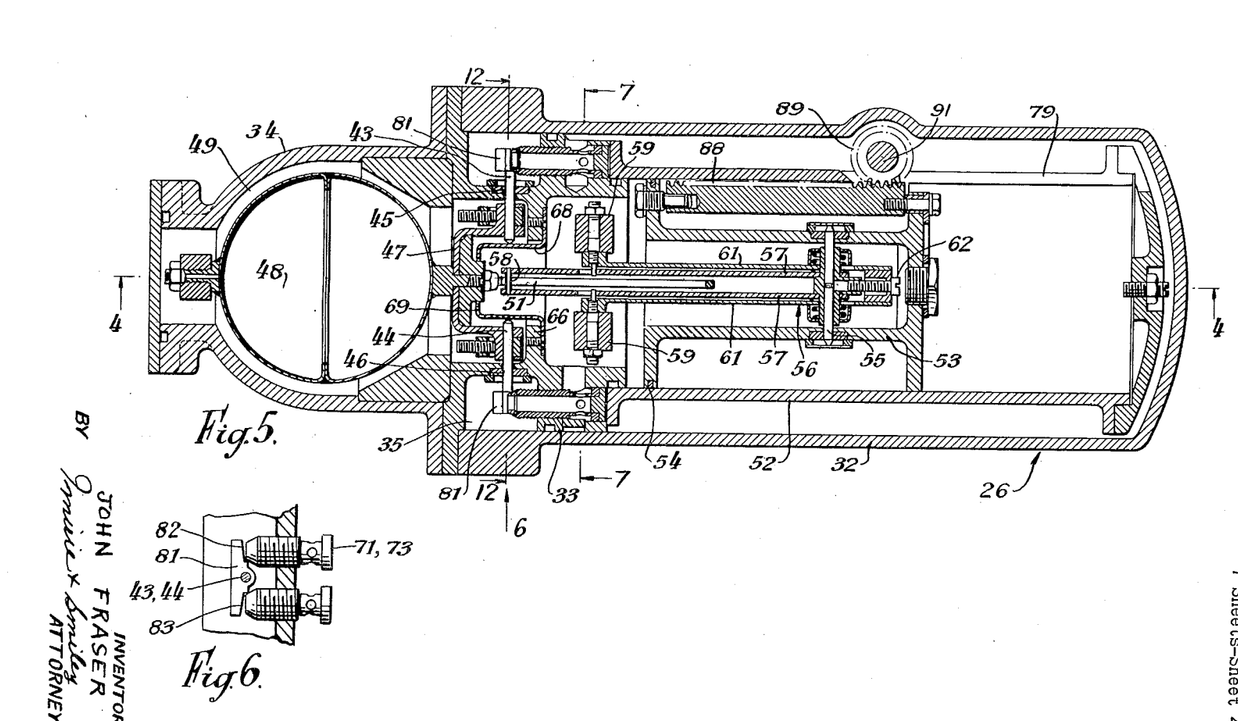
FIGURE 5 is a sectional plan view taken on the line 5—5 of FIGURE 4.
FIGURE 6 is a detail view looking in the direction of the arrow 6 in FIGURE 5, some parts being shown in section.
Figures 7, 8, 9, 10:
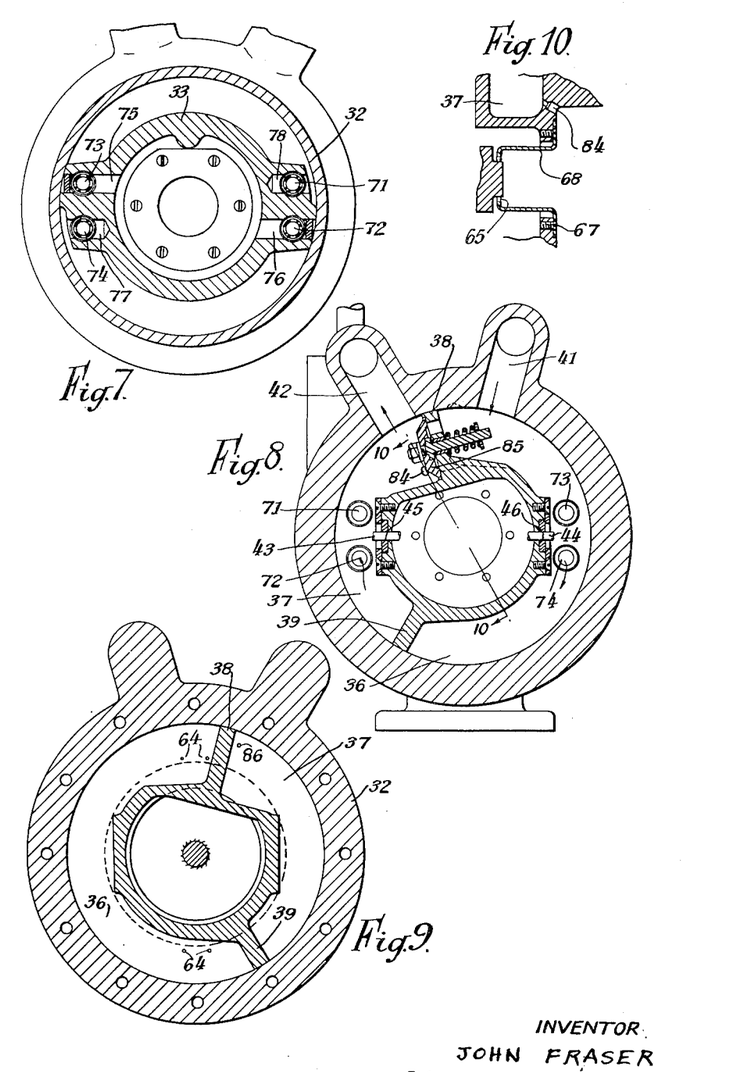
FIGURE 7 is a section on the line 7—7 of FIGURE 5.
FIGURE 8 is a section on the line 8—8 of FIGURE 4.
FIGURE 9 is a section on the line 9—9 of FIGURE 4.
FIGURE 10 is a section on the line 10—10 of FIGURE 8.

The pivot pins 43 and 44 supporting the float, and the pivot 55 for the arm 56, are all horizontal and, as shown in FIGURE 5, the pin 58, when the piston is at the end of its stroke nearest to the head 33, is co-axial with the pivot pins 43 and 44, the position of the piston at that end of its stroke being determined by an adjustable stop 63. The bore of the head 33 is restricted intermediate its ends by an internal flange 66 to which is secured, by screws 67, an external flange on one end of a thin sleeve 68 the other end of which is formed with an internal flange 69 defining an aperture 65 through which the arm 51 passes with a clearance. A small passage 84 is provided in the head 33 connecting the adjacent end of the cylinder 52 to the outlet chamber 37, as shown in FIGURE 10.

Liquid flows into the float chamber 49 through apertures 64 leading from the inlet chamber 36, and passes from the float chamber 49 into the end of the cylinder 52 adjacent the head 33 through the aperture 65. The passage 84 provides for the escape of this liquid to the outlet chamber 37 without causing a pressure reaction on the piston 53, the relative areas of the aperture 65 and the passage 84 being suitably chosen.

Movement of the float 48 about the axis of the pivot pins 43, 44 actuates valves which control passages connecting the two ends of the cylinder 52 to the inlet and outlet chambers 36 and 37 respectively. Each valve comprises an obturating member carried by one of the pivot pins 43 and 44 and co-operating with the open end of a tubular member mounted in the head 33. Four valves are provided, the tubular members 71, 72, 73 and 74 thereof being shown in FIGURES 7 and 8, from a comparison of which figures it will be observed that the said tubular members are arranged in two pairs, the members of each pair being arranged symmetrically on opposite sides of a diametral plane of the head containing the axes of the pivot pins 43 and 44. The open ends of the tubular members 71 and 72 open into the outlet chamber 37 and the open ends of the tubular members 73 and 74 open into the inlet chamber 36. Each of the tubular members 71, 72, 73 and 74 has radial passages opening into one of four passages in the head 33, the passages 75 and 76 into which the radial passages in the members 72 and 73 open leading into the central bore of the head 33 and so communicating with the end of the cylinder 52 adjacent the head 33, whilst the passages 77 and 78 into which the radial passages in the members 71 and 74 open lead to the exterior of the head and so communicate, through the shell 32 and a slot 79 (FIGURE 5) in the cylinder with the end of the latter remote from the head 33. In FIGURE 5, the members 71 and 73 are shown in the plane of the section for convenience, though in fact they lie in front of that plane. Each of the pivot pins 43 and 44 carries an obturating member 81, and reference to FIGURE 6 shows that the said obturating member co-operates with two tubular members 71 and 72 or 73 and 74, having relatively inclined flat surfaces 82 and 83 co-operating with the open ends of the said tubular members in such a way that movement of the float about the pivot axis moves the said obturating members to increase restriction of flow of liquid through one tubular member of each pair and to reduce restriction of flow through the other.

The arrangement of the tubular members is such that movement of the float in one direction increases the freedom of connection of one end of the cylinder to the inlet and reduces the freedom of connection of that end of the cylinder to the outlet, whilst reducing the freedom of connection of the other end of the cylinder to the inlet and increasing its freedom of connection to the outlet, whereas movement of the float in the other direction has the opposite effect, so that oscillation of the float through a position in which both tubular members of a pair are equally restricted produces an alternating pressure differential acting on the piston, tending to move it to and fro in the cylinder.

A relief valve 85 (FIGURES 4 and 8) permits liquid to flow directly from the inlet chamber 36 to the outlet chamber 37 if the pressure differential between them exceeds a predetermined value. Bleed passages 86 and 87 (FIGURE 4) respectively connect the float chamber 49 and the shell 32, at their highest points, to the outlet chamber 37, to avoid trapping of air.

Figure 11:
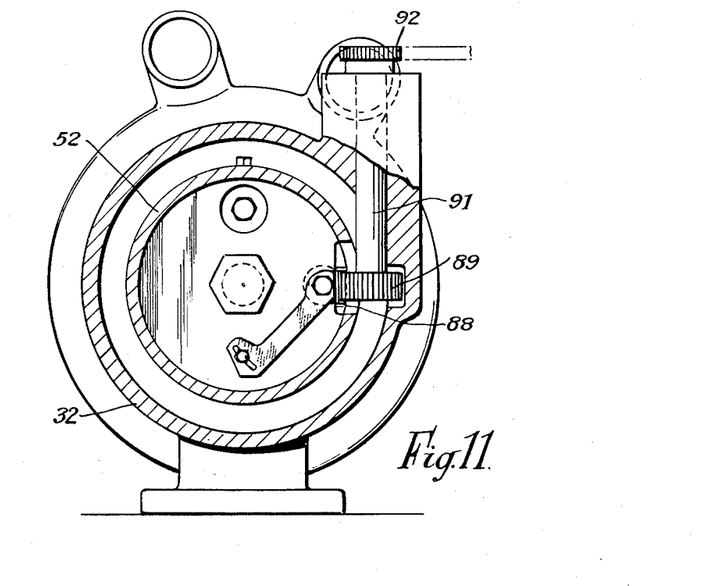
FIGURE 11 is a section on the line 11—11 of FIGURE 4.
Figure 12:
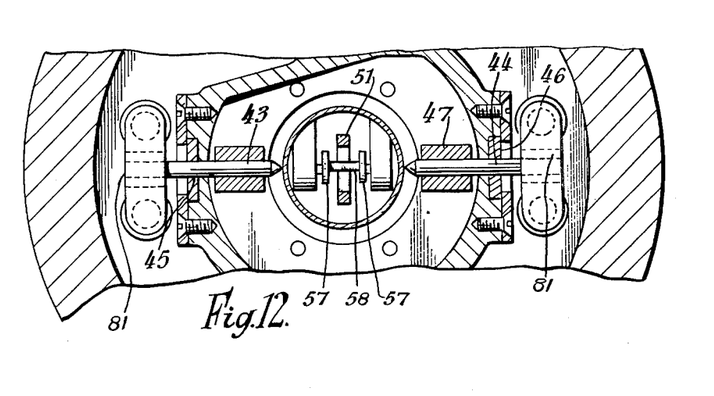
FIGURE 12 is an enlarged section on the line 12—12 of FIGURE 5.

From the above description it will be apparent that variations in the density of liquid in the float chamber 49 will cause movement of the piston 53 in the cylinder 52, and this movement is used to vary the velocity ratio of the gearing as has been mentioned with reference to FIGURES 1 to 3. As shown in FIGURES 5 and 11, the piston 53 carried a rack 88 with which meshes a pinion 89 carried on a spindle 91 projecting through the shell 26 and carrying a pinion 92 on the outside thereof.

Referring now to FIGURE 2, the driving spindle 93 of the volume indicator 25, which is driven by the gearing 24, drives through bevel gears 94, a spindle 95, and bevel gears 96, a shaft 97 carrying a gear wheel 98 meshing with external gear teeth 99 on a gear member 101 which also has internal gear teeth 102. Another gear wheel 103 on the shaft 97 meshes with a gear wheel 104 mounted on the shaft of a driving disc 105 of a continuously variable-speed friction gear. The driven disc 106 of the friction gear, which is capable of being moved radially across the face of the driving disc 105 by the movements of the piston 53, as will be hereinafter described, carries a pair of eccentric rods 107 (FIGURE 3) engaging in notches 108 in a disc 109 mounted on a spindle 111 which drives, through bevel gears 112, a spindle 113 carrying a pinion 114 co-axial with the gear member 101. A planet carrier 115 freely rotatable on the spindle 113 carries planet pinions 116 meshing with the internal teeth 102 of the gear member 101 and with the pinion 114, the said planet carrier 115 having integral with it a pinion 117 meshing with a gear wheel 118 on the input shaft 119 of the weight indicator 31.

The gear member 101, pinion 114 and plant carrier 115 constitute a differential gear of the epicyclic type compounding the rotations of the shaft 97 and the spindle 113, and applying the compounded rotation to the weight indicator, the velocity ratio of the shafts 97 and 119 varying with the radial position of the driven disc 106 of the friction gear on the driving disc 105.

The driven disc 106 of the friction gear is moved across the face of the driving disc 105 by a pinion 121 engaging a rack 122 on one end of which the disc 106 is rotatably mounted, the pinion 121 being mounted on a shaft 123 which also carries a pinion 124 in mesh with the pinion 92.

Figure 4:
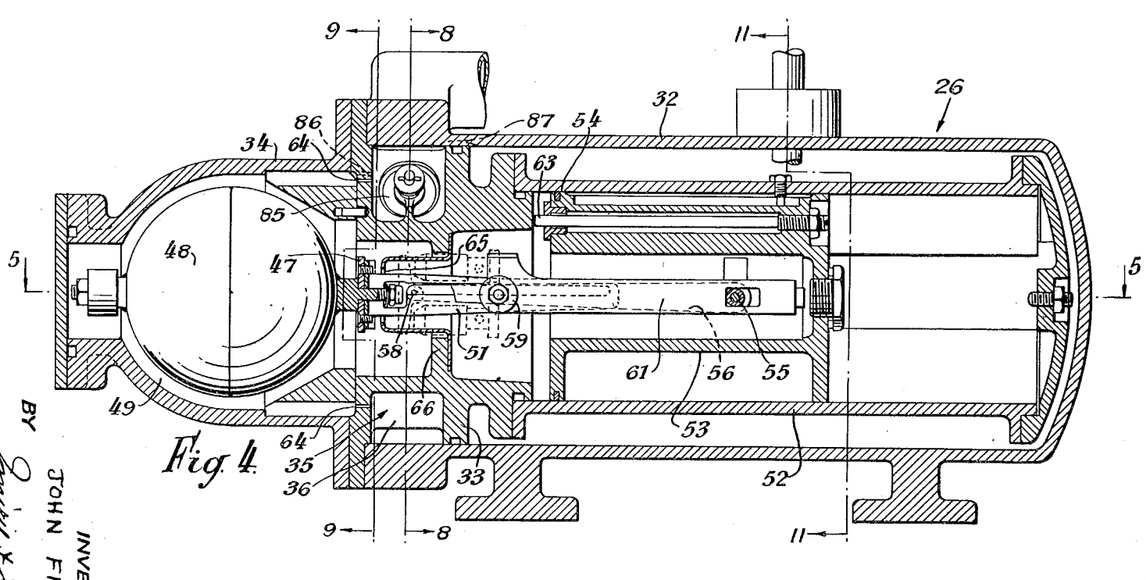
FIGURE 4 is a sectional side elevation of density-responsive means embodied in the metering device of FIGURE 1, the section being taken on the line 4—4 of FIGURE 5.

The operation of the metering device according to the present invention is as follows. Liquid to be measured is pumped through the displacement meter 20, and a proportion of such liquid, before reaching the meter 20, flows through the housing 26. The liquid flowing through the housing 26 maintains both the float chamber 49 and the shell 32 full of liquid, there being a continuous flow through the float chamber 49 so that the density of the liquid therein is at all times equal to that of the main body of liquid flowing through the displacement meter. The liquid in the float chambers exerts a lifting force on the float 48 which varies with the density of the said liquid. The float 48 oscillates up and down in the float chamber 49 and causes the obturating members 81 to repeatedly reverse the pressure differential across the piston 53, so that the piston reciprocates in the cylinder, the piston being always out of phase with the float since the pressure differential is reversed when the float passes through a means position in which the obturating members provide equal restriction of flow of liquid into and out of both ends of the cylinder 52 and the weights 59 do not reach a position in which they change the effective buoyancy of the float sufficiently to reverse its movement until it has passed the means position. Moreover, due to the inertia of the float, the weights must move to a position beyond that at which the float is just supported by the liquid before the movement of the float is reversed and, due to the inertia of the piston, will move even further before the piston comes to rest, so that the float is always unbalanced, and oscillates independently of changes in the density of the liquid, its effective buoyancy, which depends on the position of the weights 59, varying about a mean value. This mean value varies with the density of the liquid since, as the said density decreases, the weights 59 must make a greater movement in the direction to increase the effective buoyancy to produce upward movement and a lesser movement in the direction to increase the effective buoyancy to produce downward movement, and the reverse effect takes place as the density increases. The piston 53 reciprocates with the counterweight and its means position thus also depends on the density of the liquid. The reciprocation of the piston causes the driven disc 106 of the continuously variable speed friction gearing to move to-and-fro across the driving disc 105, so that the mean velocity ratio in the drive transmission between the meter 20 and the weight indicating device 31 varies with the density and, by suitable calibration of the mechanism produces, at the weight indicator, an accurate indication of the weight of liquid flowing through the metering device.

Figure 13:
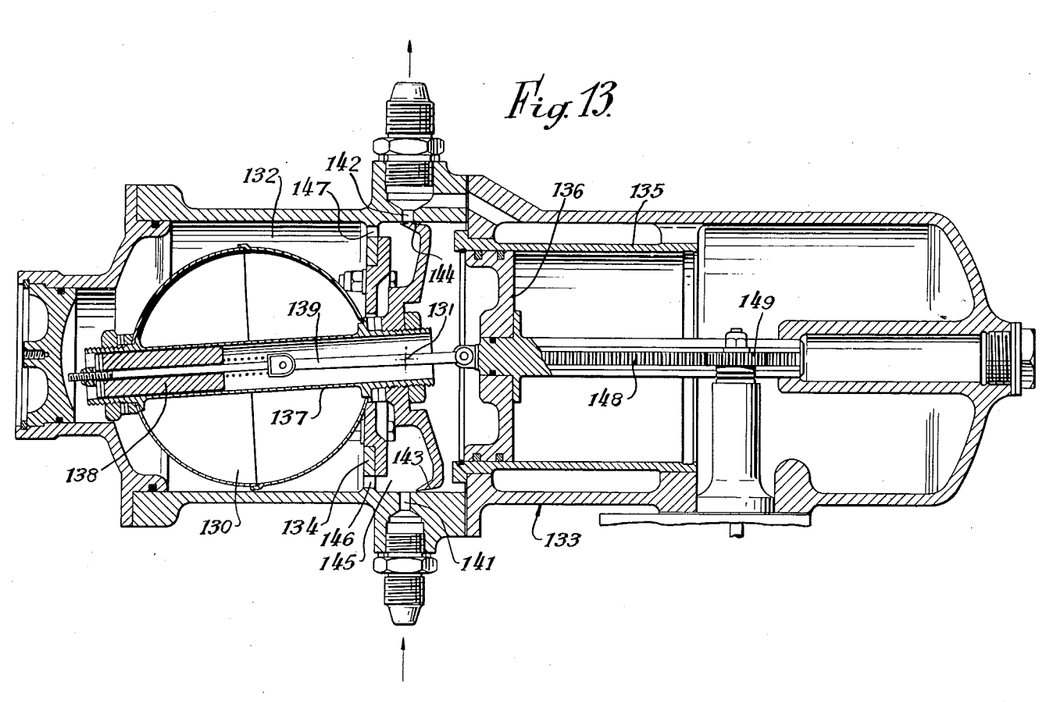
FIGURE 13 is a view similar to FIGURE 4, showing a modified density responsive means.

FIGURE 13 shows a modified form of density responsive means in which a float 130 moving about a horizontal pivot at 131 is housed in a float chamber 132 formed in one end of a hollow cylindrical body 133 and separated from the remainder of the interior of the body by a partition 134. In the other end of the body there is mounted a cylinder 135 in which is slidable a piston 136. The float 130 has extending through it a central tube 137 in which is slidably mounted a weight 138 coupled by a pivotally mounted rod 139 to the piston 136. A proportion of the liquid to be measured flows through the body 133 as previously described, entering through an inlet at 141 and leaving through an outlet at 142, and a pair of obturating members 143 and 144, moving with the float 130, co-operate with the inlet and outlet respectively to obstruct the former and expose the latter as the float rises, and to obstruct the outlet and expose the inlet as the float falls.

The inlet 141 and outlet 142 open into a chamber 145 closed at one side by the piston 136, the said chamber 145 being connected to the float chamber by ports 146 and 147. The space on the other side of the piston 136 is directly connected to the outlet in such a manner that flow to the said outlet therefrom is not obstructed by the obturating member 144. The piston 136 has extending from the side thereof opposite to the float chamber 132 a rack bar 148 meshing with a pinion 149 corresponding to the pinion 92 of the previously described embodiment. Resilient means (not shown) acting through the gearing which the rack bar 148 adjusts the position of the driven member of the continuously variable friction gearing, urge the piston 136 towards the float chamber 132, and the variations in the relative restriction of the inlet 141 and outlet 142 due to changes in the position of the float 130 cause changes in the liquid pressure acting on the side of the piston adjacent the float chamber which produce movements of the piston in the cylinder. Such movements displace the weight 138 relative to the pivot of the float to change the buoyancy of the latter and the float, as in the previously described embodiment oscillates about a mean position which varies with the density of the liquid and so adjusts the reading of the weight indicator in accordance with the density variations.

I claim:
1. A liquid metering device comprising a liquid meter of the displacement type and including a rotary member driven by the flow of liquid through the meter; an indicating device; transmission means including a differential mechanism comprising first, second and third elements, fixed ratio driving means driven by said rotary member and driving the first element of said differential mechanism, variable ratio driving means driven by said rotary member and driving the second element of said differential mechanism, the third element of said differential mechanism driving said indicating device; and a control unit for said variable ratio driving means comprising a casing, a float chamber in said casing, a cylinder in said casing, a piston in said cylinder, means operated by said piston to vary the ratio of said variable ratio driving means, a float in said float chamber, means to direct at least a portion of the liquid flowing through said meter to flow through said float chamber, and means responsive to movement of said float to cause said liquid to apply a varying thrust to said piston and move it to vary the ratio of said variable ratio driving means in accordance with changes of density of the liquid.

2. In a liquid metering device including a conduit, a liquid meter of the displacement type in said conduit, a rotary member driven by the flow of liquid through the meter, an indicating device driven by said rotary member, and means for varying the drive ratio between the rotary member and the indicating device in accordance with changes in the density of liquid flowing through the conduit, the provision of a drive ratio varying unit comprising a casing having an inlet and an outlet, a float chamber, in said casing, a float in said float chamber, a cylinder in said casing, a piston in said cylinder, means operated by said piston to vary the drive ratio, means to direct at least a portion of the liquid flowing through said conduit to the inlet of said casing and to return said liquid to the conduit, flow control means in said casing to control the connections of at least one end of the cylinder to said inlet and outlet so as to vary the liquid pressure acting on said piston, said flow control means being operated by said float, and a movable weight acting on said float and moved by said piston to vary the effective buoyancy of the float alternately in opposite directions.

3. A liquid metering device for measuring the weight of liquid passing through a conduit comprising a liquid meter of the displacement type including a rotary member driven by the flow of liquid through the meter, an indicating device, a drive transmission between said rotary member and said indicating device and including a continuously variable speed gear and means for varying the drive ratio of said continuously variable speed gear in accordance with changes in the density of the liquid passing through the conduit, said last mentioned means comprising a float chamber, conduit means connecting said float chamber to said conduit at two points in said conduit spaced in the direction of liquid flow in said conduit, a counterweight movably coupled to said float to vary the effective buoyancy thereof, a cylinder, a piston movable in said cylinder, means connecting said counterweight to said piston, means connected to said piston for controlling said continuously variable speed gear, means for applying liquid pressure to at least one end of said cylinder to produce to-and-fro movement of the piston therein, and means operated by the float to vary said liquid pressure in opposite directions as the float moves in opposite directions from a mean position whereby the to-and-fro movement of the piston moves the counterweight to adjust the effective buoyancy of the float and reverse its direction of movement so that the movement of the piston takes place about a mean position depending on the density of the liquid and causes the drive ratio to vary about a corresponding mean position.

4. In a liquid metering device including a conduit, a liquid meter of the displacement type in said conduit, a rotary member driven by the flow of liquid through the meter, an indicating device driven by said rotary member, and means for varying the drive ratio between the rotary member and the indicating device in accordance with changes in the density of liquid flowing through the conduit, the provision of a drive ratio varying unit comprising a casing having an inlet and an outlet, a float chamber in said casing, a float in said float chamber, a cylinder in said casing, a piston in said cylinder, means operated by said piston to vary the drive ratio, means to direct at least a portion of the liquid flowing through said conduit to the inlet of said casing and to return said liquid to the conduit, passage means connecting both ends of said cylinder to both said inlet and said outlet, obturating means operatively connected to said float to control said passages so as to respectively increase and reduce resistance to liquid flow between one end of the cylinder and the inlet and outlet, and to respectively reduce and increase resistance to liquid flow between the other end of the cylinder and said inlet and outlet and thereby repeatedly reverse the direction of thrust on the piston as the float moves to-and-fro, and a movable weight acting on said float and moved by said piston to vary the effective buoyancy of the float alternately in opposite directions.

5. A liquid metering device according to claim 1 wherein the variable ratio driving means comprises a first friction disc driven by said rotary member and a second friction disc driven by said first disc and movable diametrically across the face of the first disc to vary the transmission ratio, means connecting said second disc to the second element of the differential mechanism and means operated by the said piston to move the second friction disc across the face of the first friction disc.

References Cited in the file of this patent
UNITED STATES PATENTS

| | | |
|---|---|---|
| 808,150 | Fristoe | Dec. 26, 1905 |
| 2,031,852 | Poillot | Feb. 25, 1936 |
| 2,222,551 | Ziebolz et al. | Nov. 19, 1940 |